Patented Mar. 6, 1923.

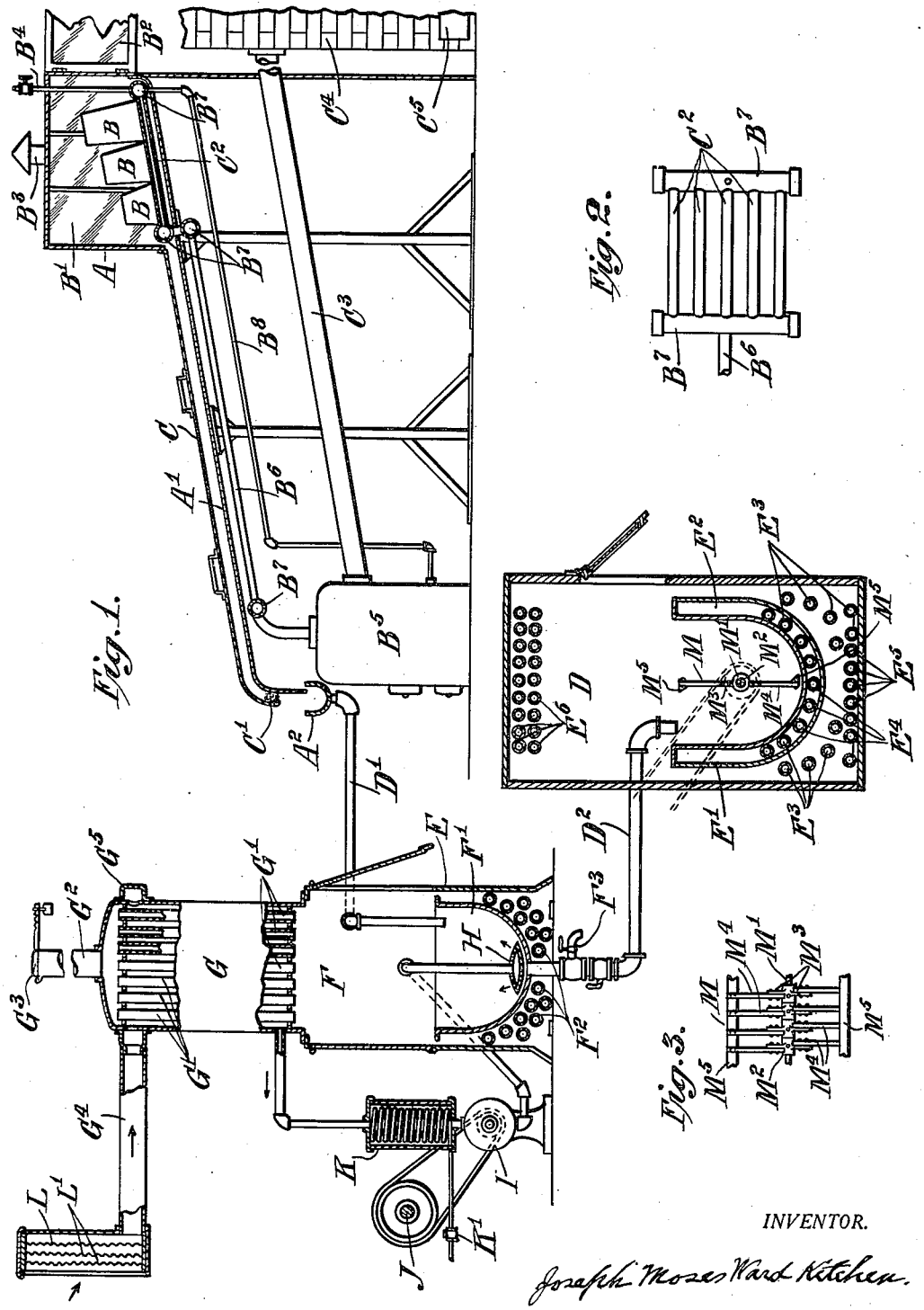

1,447,250

UNITED STATES PATENT OFFICE.

JOSEPH MOSES WARD KITCHEN, OF EAST ORANGE, NEW JERSEY.

METHOD OF TREATING BUTTER.

Application filed April 20, 1917. Serial No. 163,391.

*To all whom it may concern:*

Be it known that I, JOSEPH MOSES WARD KITCHEN, a citizen of the United States, residing in the city of East Orange, county of Essex, and State of New Jersey, have invented Improvements in Methods of Treating Butter, of which the following is a specification.

The present invention, which is a continuation in part of my copending application, Sr. No. 65,994, relates to a specific apparatus and method for treating butter, that is in harmony with the principles disclosed and claimed in my Patent No. 1,125,693; but which is an advance on that invention in various particulars.

The main aim of the present invention has been to devise an economical and effective method of overcoming the pathogenic dangers and the hygienic objectionable character, as well as edibly offensive flavors and odors in butter due to the infections of milk and cream by pathogenic and so-called putrefactive germs and their proliferation in cream and butter, and the absorption in milk of volatile putrid matters produced outside of the cream.

Although the method can be used in connection with the renovation of butter of so bad a character that such butter usually is recognized as needing renovating treatment, the invention particularly has for purpose, treating the butter that is sold in immense quantities without having been considered as having need of any special processing treatment. Practically all the butter made prior to the invention of the present method of treating that product, has been from cream that has not been treated in any way to prevent putrefactive processes that occur in milk and cream at temperatures either higher or lower than those temperatures which prevent acid fermentations in the milk and cream. As a matter of fact, there are a number of varieties of milk infecting germs that proliferate at temperatures much below 45° F., and above 90° F., which form ferment products that at least are not wholesome and sometimes may be poisonous. Practically all milk as produced, contains so-called putrefactive germs, which under conditions favorable to their growth, produce products that offend taste and smell. It is the elimination of such products, as well as the destruction of pathogenic germs, that is a prominent object of the present invention; and, that such accomplishment be effected without prominently obvious damage being done to the butter treated.

It is now known that about the same proportion of the public butter supply is infected with the viable germs of bovine tuberculosis as is the milk supply; and that all butter that is not sterilized in packages that are hermetically sealed against atmospheric infection before their sterilization, is more or less infected with living germs derived from infections occurring at the point of production of the milk, or those which have developed through proliferation in the milk and cream from which the butter is made, in the butter after its making, or else, which comes from atmospheric or other sources of infection. This being so, it should be obvious that the usual methods of making and handling butter are defective in so far as securing absolute safety and highest wholesomeness of quality in that food is concerned.

The basic principles applied in the present invention are: to heat all the materials of which butter is made, sufficiently to destroy life in at least all pathogenic germs present in the butter, and to control by refrigerative influence all undesirable fermentations of living bacteria in all the materials from which the butter is made, as well as in the butter itself. That the carrying out of these principles as connected with the production and preservation of butter is not a simple matter, is evidenced by the fact that until the advance in methods devised by me were evolved, no complete solution of the related problems connected with butter infections had been originated.

The inventive ideas in my Patent No. 1,125,693, besides providing for the unification of various makes of butter into one quality, comprises that of preventing or overcoming in a simple and effective manner, the formation of fat crystals in butter that has been heated to a pasteurizing or higher heat. That result is attained through a sufficient stirring and agitation of the butter that has been heated while it is undergoing cooling to a solidifying temperature. That method offers a convenient and economical method of rendering butter of questionable sanitary character entirely safe for consumption.

The principal purposes of the present invention are:

(1) To conveniently and economically heat butter to, and maintain it at a definite temperature destructive of dangerous germs, without overheating it, and thus unnecessarily damaging its texture, flavor and aroma.

(2) To secure quickness in the cooling of heated butter.

(3) To secure an adequate admixture, stirring, or agitation of the butter while it is cooling, and thus prevent or overcome formation in the butter of fat crystals.

(4) To provide for the manual manipulation of the butter both before and after its heating and solidification.

(5) To provide for an economical adequate aeration of the butter to any extent, when such performance is desirable; and (6) To economize in the matter of heat expenditure in the heating of the butter that is required to renovate it, or to pasteurize or to sterilize it, through the regenerative use of the heat applied in its aeration.

The application of these principles is illustrated in the accompanying drawings of a butter treating plant; in which, Fig. 1 represents, mostly in vertical section, heating, aerating, cooling, and stirring parts of the invention. Fig. 2 represents a plan view of a butter melting grid or platform composed of hot water pipes and headers; and Fig. 3, represents a detailed fragmentary elevation of the stirring and scraping part, also shown in Fig. 1.

The reference characters indicate as follows:

A is the entire butter melting, aerating, cooling and stirring apparatus; $A^1$ indicates an aerating sheet-metal surface for the progressive heating and aeration of melted butter; $A^2$ represents a collecting trough for the melted aerated butter. B, B, B represents unmelted forms of butter; $B^1$ is a glass-enclosed dust excluding apartment; $B^2$ is the door of the apartment, partly broken away; $B^3$ is a fume exit; $B^4$ is an air vent for the pipe heating system; $B^5$ is a hot-water heating boiler; $B^6$ are heating pipes; $B^7$ are heating pipe headers; $B^8$ is the return water conduit to the boiler $B^5$.

C is a removable cover which protects the melted butter gravitating over the sheet surface $A^1$ from atmospheric infections, and which also confines an ascending current of warmed air and fumes in close contact with the gravitating melted butter which is progressively increased in temperature; $C^1$ is an open-work trough filled with moistened air-filtering material; $C^2$ is a hot water pipe-grid on which the forms of butter are placed for melting; $C^3$ is a smoke pipe; $C^4$ is a chimney; $C^5$ is a chimney check draft.

D is an enclosing structure excluding atmospheric dust and bacteria; $D^1$ is a melted butter conduit; $D^2$ is still another melted butter conduit.

E is an aerating apparatus; $E^1$ is a jacketed heating and cooling vat, of which $E^2$ is the jacket part; $E^3$ are heating pipes; $E^4$ are refrigerating pipes; $E^5$ are also heating pipes; $E^6$ are also refrigerating pipes.

F is another protective enclosure excluding atmospheric infective matters; $F^1$ is an aerating vat; and $F^2$ are heating pipes.

G is a heat exchanger; $G^1$ are heat transmitting tubes; $G^2$ is an exhaust conduit; $G^3$ is an exhaust gas pressure regulating device; $G^4$ is a fresh air conduit; $G^5$ is an air collar surrounding the heat exchanger G.

H is an aerating device for distributing air in divided streams through melted butter.

I is an air blower.

J is a shaft and pulley.

K is an accessory air heater; $K^1$ is a controlling valve.

L is an air screening device; $L^1$ are air filtering slides.

M is a revolving, stirring-device; $M^1$ is the motor shaft of the stirring device; $M^2$ are hubs; $M^3$ are off-sets; $M^4$ are wooden arms; and $M^5$ are longitudinal scrapers.

The method of operating the apparatus herein illustrated, is as follows:

If butter is to be given a pasteurizing treatment or a complete sterilization without aeration, the butter, B B B, may be directly placed in the jacketed vat $E^1$; or, if needing aeration, it may be melted on the melting platform or pipe-grid $C^2$ in an enclosed protecting apartment $B^1$, from which the melted butter finally flows into the vat $E^1$. This vat $E^1$ is enclosed in the closed apartment D. The temperature of the apartment D is sufficiently raised by the heating pipes $E^4$ to sterilize the atmosphere in the apartment D, and thus prevent infections from the apartment's atmosphere contaminating the butter in the vat $E^1$. There is a non-congealable fluid in the jacket $E^2$, which is sufficiently heated by the heating pipes $E^3$ placed in the jacket, until the butter in the vat acquires a temperature of at least 145° F. or higher. The butter is held at that temperature for thirty minutes or more, being stirred or kept in a state of admixture and uniformity of temperature by revolving the device M. This action also prevents unnecessary heating of the butter by too prolonged contact with the heated metal lining of the vat.

If the butter treated does not need any special renovation to eliminate undesirable odors and flavoring principles from it, the butter after being held for thirty minutes or more in the vat E¹, until pathogenic or other undesirable germs are destroyed, is refrigerated through the influence of the refrigerative pipes E⁴, which are also placed in the jacket of the vat, assisted by the refrigerative piping E⁶, located at a high level in the apartment D.

During the cooling of the heated butter the stirring device M is continually revolved until the butter has all of its constituents uniformly readmixed and becomes so solid that the production of fat crystals in it is prevented or are broken up. The stirring device M is composed of a number of hubs M² strung onto the shaft M¹, and fastened thereto by set-screws. These hubs have off-sets M³, to which are bolted wooden arms M⁴. The wooden arms are connected at their distal ends by a longitudinally arranged scraper M⁵. The wooden arms M⁴ are so formed with bevelled edges, and so attached to the off-sets M³, that when the device M is revolved, the butter is alternately forced towards and from the ends of the vat E¹; while the scraper M⁵ removes the butter as it is refrigerated and becomes solidified on the metallic inner surface of the vat, and admixes it, in connection with the action of the arms M⁴, with the entire butter mass in the vat, the stirring being continued until the butter has become sufficiently solid to prevent the formation of the fat crystals.

In case the butter requires an unusually extended aerating treatment, the fluid butter is run into the aerating vat F¹, which is located in the heated closed apartment F, the temperature of which apartment is maintained at a pasteurizing or higher heat as may be required. In the vat F¹, in case the melted butter has objectionable volatile constituents needing to be eliminated, the caseous and watery parts of the butter, after its heating, gravitate to the bottom of the tank and are drawn off through the valve F³; and if necassary, the melted butter fat is skimmed, and may be washed with hot water, or be steamed. It is then aerated by introducing the aerating device H, which when in place, extends longitudinally the length of the tank, which is usually considerably elongated horizontally. The device H is constructed with a large number of air apertures. This device is connected with the air pump I which forces air, which may or may not be filtered, through the large number of air perforations of the device, and through the melted butter until it is sufficiently aerated.

The hot air after passing through the butter, is forced upwardly through the heating tubes G¹ of the heat exchanger G, and is finally conducted to the atmosphere at a high level, that preferably is much above the level of the air conduit G⁴ which conveys fresh air that is passed through the air filterer L to the air collar G⁵. Through this collar air is conveyed around the periphery of the heat exchanger G, and is introduced therein through numerous peripheral perforations (which are not shown) into the interior of the heat exchanger G, at a high level. From that level the air is drawn downwardly by the action of the air pump I; the fresh air being progressively heated by the hot fume laden air passing upwardly under forced pressure through the tubes G¹. The air that is passed through the melted butter and the tubes G¹, is conveyed to the atmosphere through the conduit G²; the internal pressure of the tubes G¹ being controlled by the pressure device G³, which may be of any suitable type. In the heat exchanger G, a very considerable amount of the heat used in maintaining an adequate temperature in the butter in its aeration is transferred to the fresh filtered air that is continually being indrawn and blown through the melted butter. This fresh air may be further heated in the heater K which contains a steam coil controlled by the valve K¹. Heating pipes F² help to maintain a desired temperature in and above the aerating vat E. The air filterer L may conveniently and effectively have in its structure a number of slides L¹, which are covered with filtering material. It is desirable that the air used in aerating the butter should be free from germs, though if the fluid butter in the aerating vat is maintained at a pasteurizing or higher temperature for a sufficient time, it may not be necessary that the aerating current should be free from germs. Through the action of the compression regulating device G³, there is maintained a more than atmospheric pressure in the tubes of the heat exchanger G; while the fresh air which is being drawn down and around the tubes G¹ through an inducing action of the air pump I, is under a pressure somewhat less than atmospheric pressure. This is a condition which is conducive to a quick positive transfer of the heat of the exhaust aerating air to the incoming fresh air.

After being sufficiently aerated, the butter is run into the vat E¹ and is then stirred and cooled after or without a further heating. The butter after being reduced to an approximate temperature of preferably about 60° F., is removed from the vat with a wooden spade, is packed in bulk packages or into print packages as may be desired; and is then given so deep a refrigeration after packing, that fermentation in it is prevented.

I especially desire to draw attention to the fact that no method of sterilization in butter can be known to be completely effective unless the butter is hermetically sealed before the sterilizing heat is applied. As this procedure is usually practically impossible, without having the butter take on a rough gritty texture from the formation of fat crystals, and without empyreumatic flavors and odors being developed as well, an important part of my invention is that of applying an unusually deep refrigerative influence whenever necessary, and wherever necessary, both to cream, and butter after its making, to prevent germinal reproduction, as well as a sufficient heating to destroy all pathogenic and most all so-called putrefactive germs. Under the practiced methods of the past, a partly satisfactory sterilization of butter has been effected, so far as the destruction of pathogenic infections of cream is concerned; but to secure wholesomeness of quality, and the maintenance of high grade gustatory character in butter, the deep continued refrigeration of it should also be exercised, when necessary, as well as adequate heating of all of the constituents in the butter.

I emphasize the fact that an important part of my invention is to prevent the fermentation of and accumulation in butter of decomposition products whether due to bacterial or to chemical influences in or outside of the butter, and to eliminate such products, as well as to destroy pathogenic germs; and also to promote keeping quality in butter by preventing the formation of the acid ferment products increase which it is believed, are the cause of degradations in the quality of butter occurring during its long storage at low temperatures, which presumably result from chemical changes.

It will be noted that this invention comprises the improvement of materials from which butter is made and of butter that is off-flavored; as well as butter that is even more viciously degraded in quality.

In connection with the auxiliary aims of the invention, it should be noted that economizing in the transmission of heat through an application of the principle of the counter-current method of heat transfer under more than atmospheric pressure, is an important feature. In carrying out the purpose of this invention, I do not confine myself to any special means or methods. It will be obvious that a great variety of means as well as processes can be utilized in order to secure the aimed for results.

In the heating boiler and piping with which I generate and apply the heat for melting the butter during its aeration, which is accomplished in a progressive heating, I, in this case, use hot water as the heating medium for the air which is immediately brought into contact with the under part of the metal sheet $A^1$. By exercising care in not overheating the water, I avoid applying unnecessary heat in the melting and progressive heating of the butter during its primary aeration; and in no case is the direct heat applied, of a temperature as high as 212° F. In my method of applying temperature influences to dairy products, I make a point of applying a large volume of heating influence for an unusually prolonged time, instead of more intense influence applied for a shorter time, as has been the usual practice. In this way, I secure a more positive and beneficial influence, with less of an empyreumatic effect, than occurs through the application of more intense heat. I, however, prefer to apply heat to a dairy product through the influence of water-vapor derived from steam expanded under atmospheric pressure, inasmuch as in this way, I avoid positively, an overheating that is apt to occur in making a direct application of hot air or of the temperature of steam under pressure. Subject matter is herein disclosed which is also disclosed in my copending applications, Sr. Nos. 65,745; 79,548; 134,040; 132,288; 157,470; 168,562; and 168,563.

It will be obvious that the principles of the present invention can be practically applied in combination with old-time known methods of processing butter by heating, reformations of butter-fat emulsions with milk or cream, churning, washing, etc.

What I claim as new is:

1. The method herein described, which consists in, (1) melting and heating butter by the application of heat of a temperature at the most lower than 212° F., and aerating the butter during its heating, said aeration being effectuated by passing a current of air against a thin sheet of melted butter moving in counter-current to the movement of the current of air, said heating being effectuated by a current of heated water moving in counter-current to the melted butter in a thin sheet, (2) further aerating the melted butter by blowing heated air through the melted butter, said air being heated by the heat of air that has already passed through the melted butter, and by other heat, said heated air being filtered from germs and receiving its heat by a transmission of the heat through the application of the principle of the counter-current transfer of heat, and (3) cooling the butter, said cooling being effectuated by the application of artificially produced refrigeration, said butter being agitated or stirred during its cooling, to prevent the formation of fatty crystals in the butter.

2. The method herein described, which consists in, (1) heating butter by heat of a melting temperature, but lower than 212° F., and aerating the butter coincidently with its heating, said aeration being effected by passing a current of air against a thin sheet of the heating butter moving in countercurrent to the movement of the current of air, said heating being accomplished by heated water moving in contracurrent to the sheet of butter, (2) further aerating the butter by blowing heated air thru the butter after its melting, and (3) cooling the butter by the application of artificially produced refrigeration, said butter being kept in a state of agitative motion during its cooling.

JOSEPH MOSES WARD KITCHEN.